(12) United States Patent
Huang et al.

(10) Patent No.: US 8,683,740 B2
(45) Date of Patent: Apr. 1, 2014

(54) INTELLIGENT CANOPY GREENHOUSE CONTROL SYSTEM

(75) Inventors: Shih-Ming Huang, Tainan (TW); Jenn-Kan Lu, New Taipei (TW); John Tsao, Shanghai (CN); Jhih-Jhong Siao, Taipei (TW)

(73) Assignees: Shih-Ming Huang, Tainan (TW); Jenn-Kan Lu, New Taipei (TW)

( * ) Notice: Subject to any disclaimer, the term of this patent is extended or adjusted under 35 U.S.C. 154(b) by 0 days.

(21) Appl. No.: 13/304,014

(22) Filed: Nov. 23, 2011

(65) Prior Publication Data

US 2012/0132375 A1     May 31, 2012

(30) Foreign Application Priority Data

Nov. 25, 2010   (TW) ................................ 99222840 U (51) Int. Cl.
*A01G 9/14*         (2006.01)
(52) U.S. Cl.
USPC .................................................. 47/17; 52/63
(58) Field of Classification Search
USPC .............. 160/104; 47/17, 29.5; 52/3, 4, 5, 63, 52/198, 199, 473
See application file for complete search history.

(56) References Cited

U.S. PATENT DOCUMENTS

| | | | | |
|---|---|---|---|---|
| 2,471,675 A * | 5/1949 | De Jongh | ......................... | 52/86 |
| 2,852,109 A * | 9/1958 | Pine | ................................. | 52/86 |
| 3,028,872 A * | 4/1962 | Cresswell | ..................... | 135/94 |
| 3,165,110 A * | 1/1965 | Brooks | ......................... | 135/124 |
| 4,047,328 A * | 9/1977 | Kehl et al. | ..................... | 47/59 R |
| 4,091,584 A * | 5/1978 | Brown | ......................... | 135/127 |
| 4,316,405 A * | 2/1982 | Esposito | ....................... | 454/253 |
| 4,399,738 A * | 8/1983 | Sharkey | ....................... | 454/237 |
| 4,567,732 A * | 2/1986 | Landstrom et al. | ............... | 62/91 |
| 4,601,136 A * | 7/1986 | Watanabe | ........................ | 52/63 |
| 4,672,889 A * | 6/1987 | Lynch | ........................... | 454/364 |
| 4,815,365 A * | 3/1989 | Dupont | ........................ | 454/254 |
| 4,915,022 A * | 4/1990 | Lynch | .......................... | 454/364 |
| 4,945,821 A * | 8/1990 | Holmberg | ..................... | 454/250 |
| 5,333,421 A * | 8/1994 | McKenna | ........................ | 52/86 |
| 6,098,335 A * | 8/2000 | Brown, Jr. | ........................ | 47/17 |
| 6,141,902 A * | 11/2000 | Boice | ................................ | 47/17 |

* cited by examiner

*Primary Examiner* — David Purol

(74) *Attorney, Agent, or Firm* — Muncy, Geissler, Olds & Lowe, P.C.

(57) ABSTRACT

An intelligent canopy greenhouse control system is provided with two main brackets symmetrically arranged, each of which penetrates a curved tubular beam at its upper edge for the curved tubular beam's one end to protrude from each main bracket. Several small crossbeams are installed between two curved tubular beams for a reinforced structure. At least a louvered shutter is provided between two curved tubular beams and between two main brackets. A film is covered between two curved tubular beams, and steel sheets are freely connected to gaps between two main brackets and under the lower edges of two curved tubular beams for development of a first skeleton unit with gutters installed, around which a canopy greenhouse can be assembled with a plurality of first skeleton units.

15 Claims, 15 Drawing Sheets

FIG. 11

INTELLIGENT CANOPY GREENHOUSE CONTROL SYSTEM

BACKGROUND OF THE INVENTION

1. Field of the Invention

The present invention relates to an intelligent canopy greenhouse control system applicable to cultivation and production of fruit trees or vegetables at different latitudes, including temperate zones (cold in winter) and subtropical zones (hot in summer), as well as different seasons and various wind directions.

2. Description of the Prior Art

As indispensible foods of human beings, plants are affected by critical conditions such as weather, water source, and soil, and may grow in greenhouses of different regions without influence of changeable weather.

Figure 1:
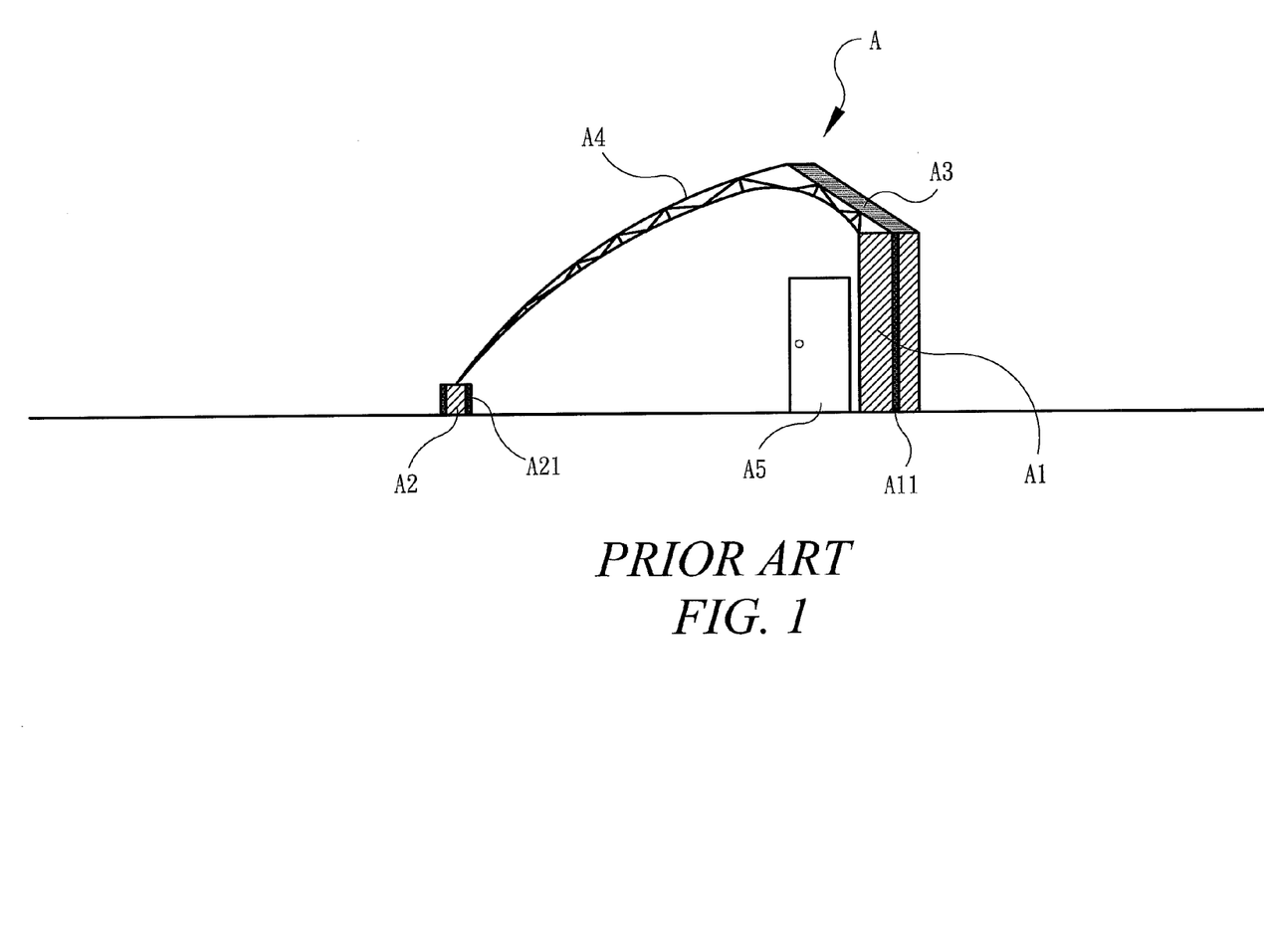
FIG. 1 illustrates a cross-sectional view of a conventional greenhouse in a temperate monsoon climate.

FIG. 1 shows a conventional greenhouse A suitable for use in a temperate monsoon climate, manufactured with one high concrete wall A1 facing a windward side and low concrete walls A2. The high concrete wall A1 is equipped with thermal insulation A11 inside, and the low concrete wall A2 is provided with double-layer thermal insulation A21 both inside and outside. An access A5 is installed on one lateral concrete wall, and a steel skeleton A3 is set up on top of the high concrete wall A1, which extends to the top of the low concrete walls A2 and is covered with a plastic film A4. Therefore, a greenhouse A is developed according to this arrangement thereof.

However, a long time is spent in building the greenhouse A having a high concrete wall A1 which is effective in resisting chilly wind, and plants in summer cannot grow inside the overheated greenhouse A, as there is no intake/vent installed except the single access A5 for ventilation only.

Figure 2:
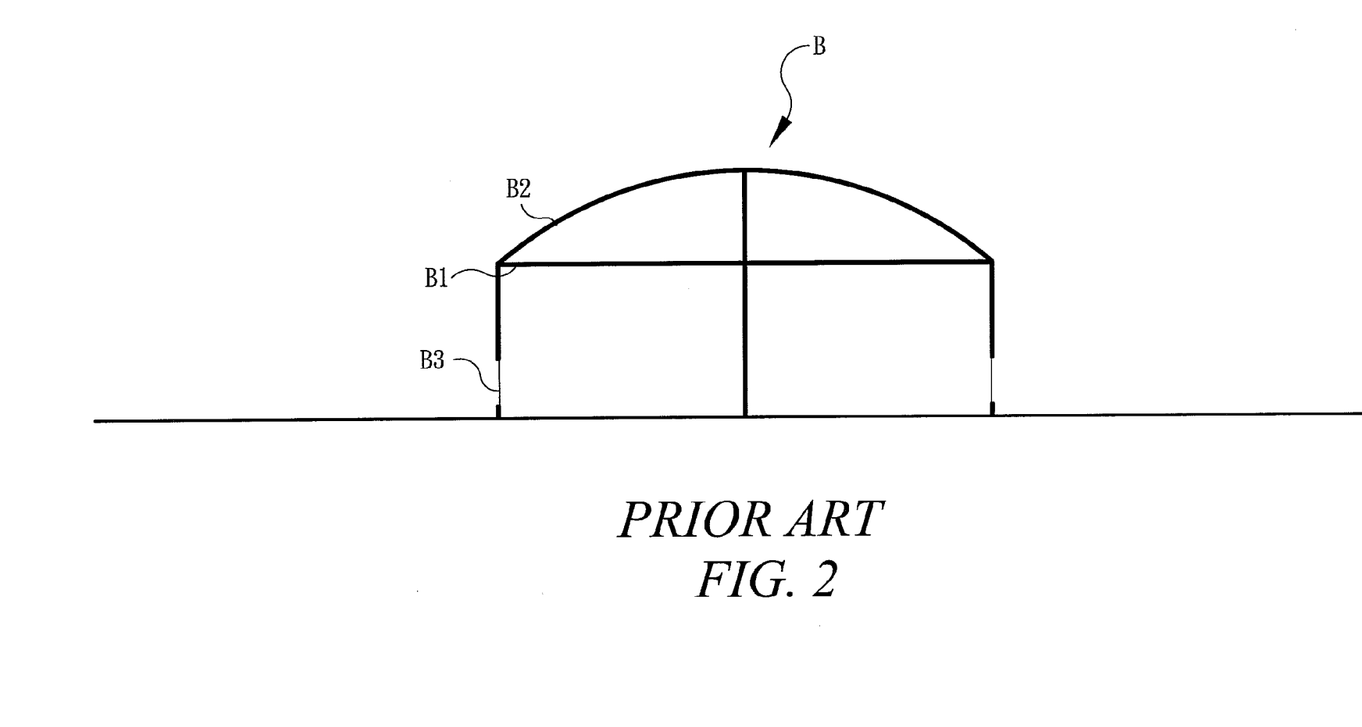
FIG. 2 illustrates a cross-sectional view of a conventional greenhouse in a subtropical monsoon climate.

FIG. 2 shows a conventional greenhouse B suitable for use in the subtropical monsoon climate, manufactured using hot-dip galvanized pipes B1 as a skeleton, and covered with a plastic film B2 on which there are several intakes/vents B3 installed. However, hot air accumulates at the top of the greenhouse B but has nowhere to go because there is no skylight in the ceiling which opens. Installation of an extra mechanical ventilation system is necessary to control the temperature in such a greenhouse B, which increases energy consumption and has a high maintenance cost.

In view of the foregoing drawbacks to conventional greenhouses, the present invention provides an intelligent canopy greenhouse control system which can be quickly constructed at a low cost.

SUMMARY OF THE INVENTION

The principal object of the present invention is to provide an intelligent canopy greenhouse control system in which certain elements can be adjusted in compliance with different latitudes, seasons, and wind directions.

Another object of the present invention is to provide an intelligent canopy greenhouse control system which can be quickly constructed at a low cost.

A further object of the present invention is to provide an intelligent canopy greenhouse control system which can be further extended laterally and longitudinally according to environmental factors.

To this end, the intelligent canopy greenhouse control system of the present invention is provided with a plurality of main brackets which are symmetrically arranged, each of which penetrates to the upper edge of a curved tubular beam, wherein one end of the curved tubular beam protrudes from each main bracket. A plurality of small crossbeams are set up between two curved tubular beams to reinforce the structure of the system. At least one louvered shutter is set up between the two curved tubular beams and the two main brackets. A film covers the two curved tubular beams, and a steel sheet wraps over gaps of two main brackets or the lower edges of two curved tubular beams to become a first skeleton. A gutter is constructed at the edge of the first skeleton unit, and at least one first skeleton unit is assembled to construct the intelligent canopy greenhouse control system.

To achieve this purpose, the intelligent canopy greenhouse control system of the present invention comprises a first skeleton unit as discussed above, and a second skeleton unit installed beside the first skeleton unit. The second skeleton unit comprises two symmetrically arranged master brackets, each of which is connected to and penetrates one end of a curved tubular beam at its upper edge, so that one end of each curved tubular beam protrudes from one main bracket and the other end is coupled with one main bracket of the first skeleton unit. Several small crossbeams are installed between two curved tubular beams for development of a reinforced structure in which there is one film covered between two curved tubular beams and also steel sheets wrapped over gaps of the two main brackets or the lower edges of two curved tubular beams, so as to become a second skeleton. Therefore, a canopy greenhouse can be assembled by means of a plurality of first and second skeleton units.

In the intelligent canopy greenhouse control system, the main bracket is a quasi-L-shaped framework provided with a port at the top for connection of a bent extension component on which one steel sheet and one louvered shutter are mounted.

In the intelligent canopy greenhouse control system, the main bracket's middle segment is connected to a curved slanted strut which is coupled with one curved tubular beam at one end and provided with a gutter between the curved slanted strut and the main bracket.

In the intelligent canopy greenhouse control system, the louvered shutters are mounted between the main brackets of the first skeleton unit, and are connected to the middle-to-lower or middle-to-upper segments of the two main brackets.

In the said intelligent canopy greenhouse control system, the film could be a thin-film solar glass or plastic film.

In the said intelligent canopy greenhouse control system, the two curved tubular beams of the first skeleton unit have extended ends, which penetrate and protrude from the main brackets and are provided with a gutter and other ends vertically contacting the ground level. Two curved tubular beams are coupled with two louvered shutters, one of which is connected to one side of the curved tubular beams near the ground and equipped with a gutter at a joint of the louvered shutter's top. A film and the other louvered shutter are vertically connected near an apex of the curved tubular beams' other side.

In the intelligent canopy greenhouse control system, the steel sheet could be a compound metal curtain steel sheet or a double-layer coated steel sheet.

In the intelligent canopy greenhouse control system, the steel sheets connected between two curved tubular beams of the first skeleton unit and lower edges of the second skeleton unit's curved tubular beams are further provided with side windows or side doors.

In the intelligent canopy greenhouse control system, a plurality of first skeleton units are assembled laterally. Each end of both of the curved tubular beams for one first skeleton unit penetrates and extends from two main brackets and is further coupled with a straight tubular beam separately. The other ends of the two straight tubular beams vertically contact the ground level for wind walls or windshields installed between two straight tubular beams.

In the intelligent canopy greenhouse control system with a first skeleton unit and several second skeleton units assembled longitudinally, each end of the last curved tubular beam of the second skeleton unit penetrates and extends from two main brackets and is further coupled with a straight tubular beam separately. The other ends of two straight tubular beams vertically contact the ground level for wind walls or windshields installed between two straight tubular beams.

In the intelligent canopy greenhouse control system, the small crossbeams installed between the two curved tubular beams of the first skeleton unit or the two curved tubular beams of the second skeleton unit are further coupled with a funnel cap for introduction of wind, on which there are two oppositely arranged vents with tubes extended from their base.

In the intelligent canopy greenhouse control system, the canopy greenhouse composed of a plurality of first skeleton units or the canopy greenhouse composed of a plurality of first and second skeleton units is developed to be an automatic environmental adjustment/control system in which there is a LED light-compensation system, sunshades, a micro-infiltrating irrigation system, a sprayer & cooling system, a $CO_2$ adjustment system and a sensor system.

DETAILED DESCRIPTION OF THE PREFERRED EMBODIMENT

Figure 3:
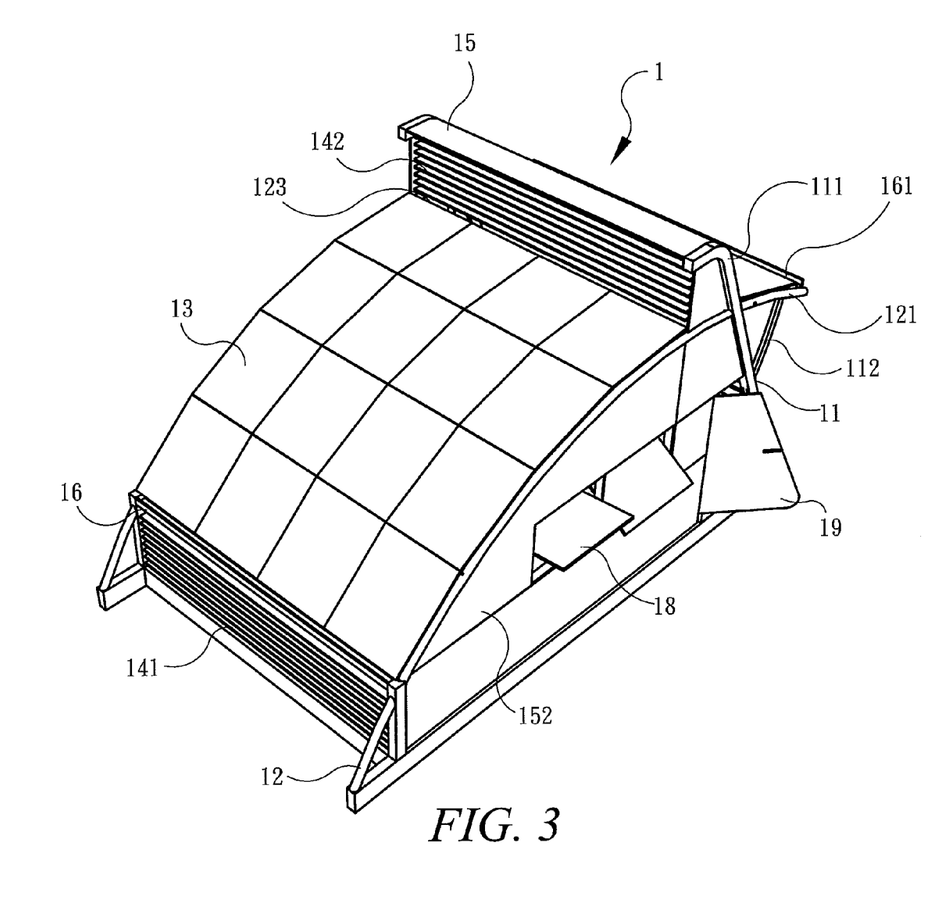
FIG. 3 illustrates a perspective view of the first embodiment of the present invention.
Figure 3A:
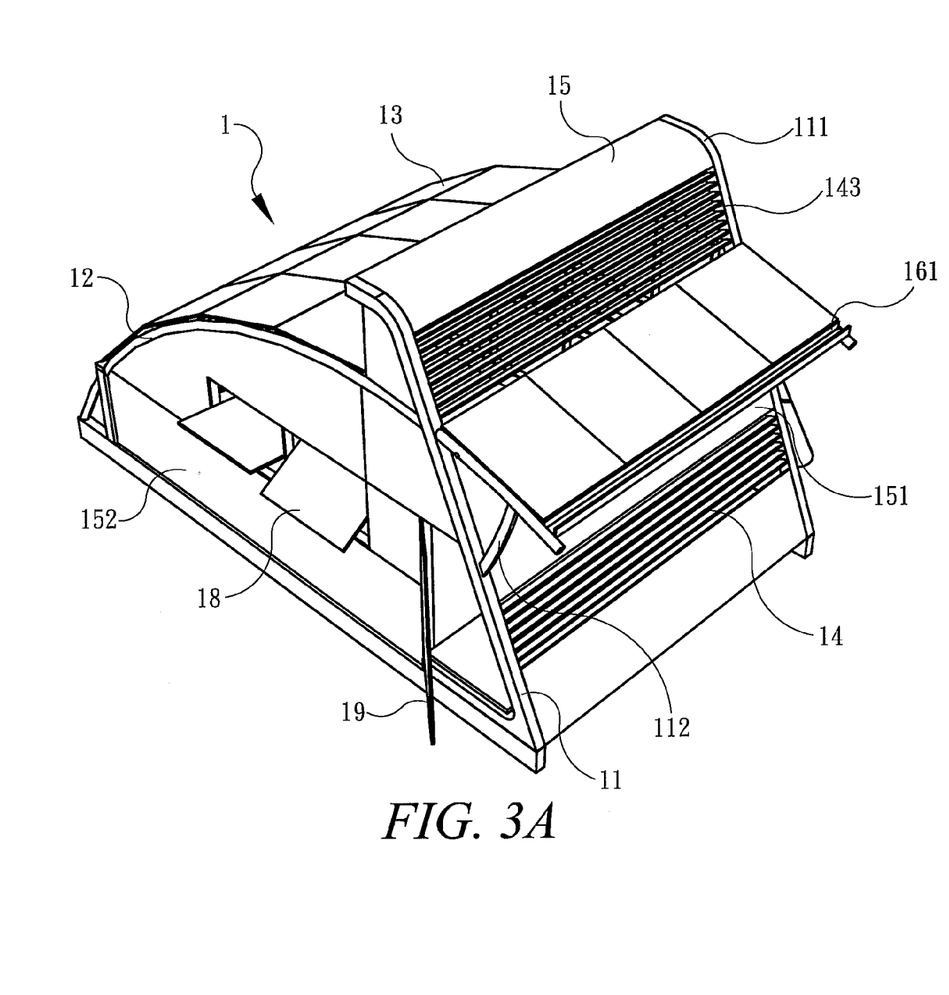
FIG. 3A illustrates another perspective view of the first embodiment of the present invention, from another viewpoint.
Figure 4A:
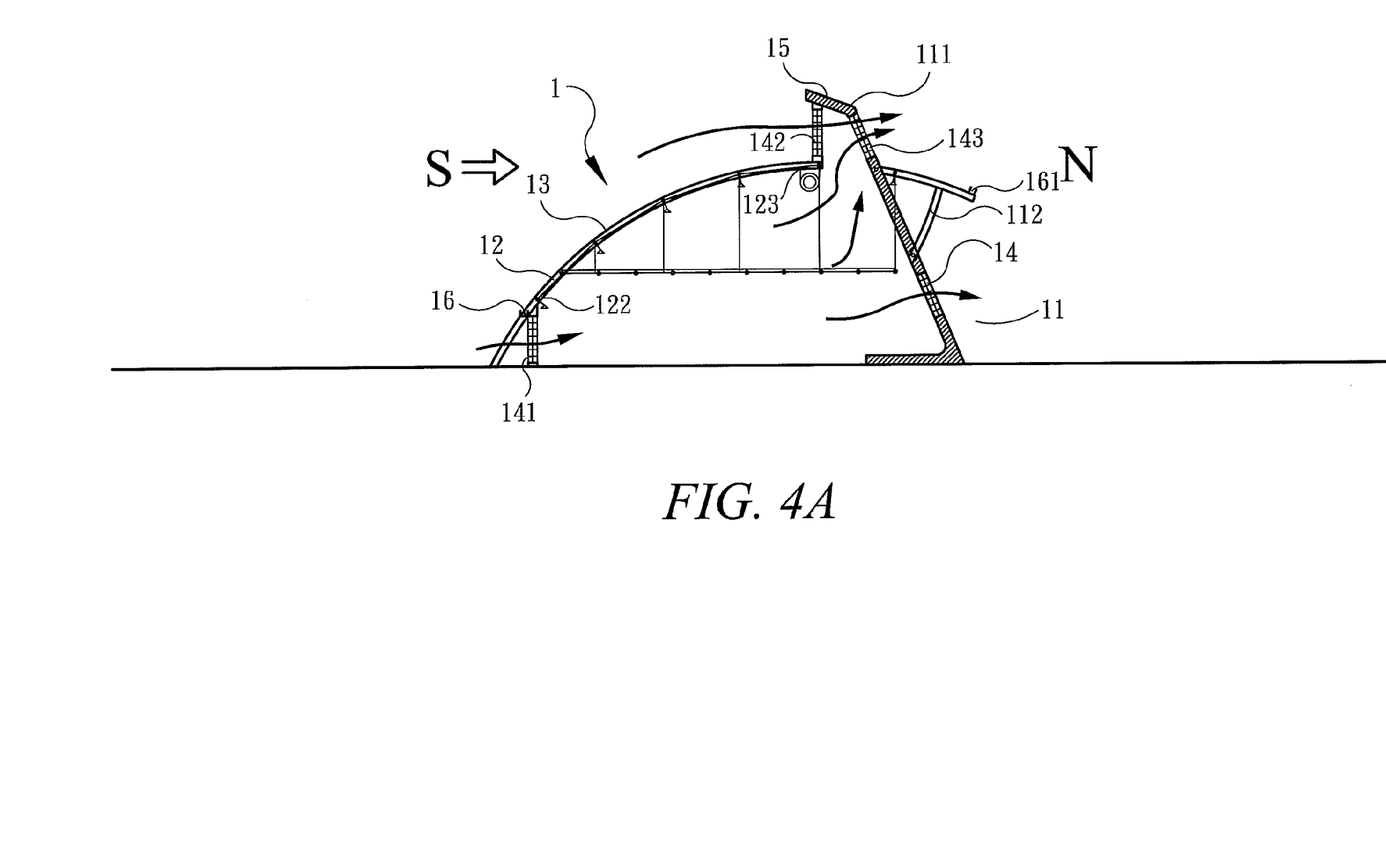
FIG. 4A illustrates a wind direction in summer of the subtropical monsoon climate for the present invention, as shown in FIG. 3.

FIGS. 3 and 3A illustrate an intelligent canopy greenhouse control system of the present invention which comprises a first skeleton unit 1 with two quasi-L-shaped main brackets 11, each of which has a port on its top end for connection of a bended extension part 111. Two louvered shutters 142, 143 and a steel sheet 15 installed on two extension parts 111 are provided, wherein two louvered shutters 142, 143 are oppositely arranged with a steel sheet covered over a small gap in between. A steel sheet 151 and a louvered shutter 14 (FIG. 5) are installed between two main brackets 11, wherein the louvered shutter 14 is located at middle-to-lower segments of the main brackets 11. An upward curved slanted strut 112 is connected to the middle segment of the master bracket 11. A gutter 161 is installed at the joint of the upward curved slanted strut 112 and the main bracket 11 (FIG. 4A). An extension segment 121 extends from one end of a curved tubular beam 12 penetrating the upper part of the main bracket 11, is connected to the upward curved slanted strut 112 on the main bracket 11, and is coupled with the gutter 16 at the edge. Equidistant small crossbeams are mounted between two curved tubular beams 12 for a reinforced structure wherein the first small crossbeam 122 near the ground level is coupled with the gutter 16 and the louvered shutter 141. A film 13 covers from a front small crossbeam 122 to a rear small crossbeam 123, which is between two curved tubular beams 12, and on the extension segment 121. The rear small crossbeam 123 is coupled with the other end of a louvered shutter 142 and the film 13 is manufactured with thin-film solar glass (in this embodiment) or plastic film. Steel sheets 152 as walls are developed from lower edges of two curved tubular beams 12 and provided with windows 18 and door planks 19.

The descriptions hereinafter are the present invention erected in a subtropical monsoon climate and allowing its film 13 to face windward in summer. FIG. 4A illustrates opened louvered shutters 14, 141, 142 and 143, wherein the louvered shutters 141, 142 are wind-driven intakes (louvered shutter 141 is a gravity intake without wind flowing). Also, the louvered shutters 14, 143 are wind-driven vents (louvered shutter 143 is a gravity intake without wind flowing). The film 13 and the steel sheet 15 on extension parts 111 are effective in guiding wind toward the vents, accelerating discharge of the interior hot air from the louvered shutter 143, and introducing outdoor air from the louvered shutters 14, 141 for higher gravity ventilation efficiency, ventilation frequency and better wind-driven ventilation efficiency at a lower layer due to the opposite louvered shutters 14, 141.

Figure 4B:
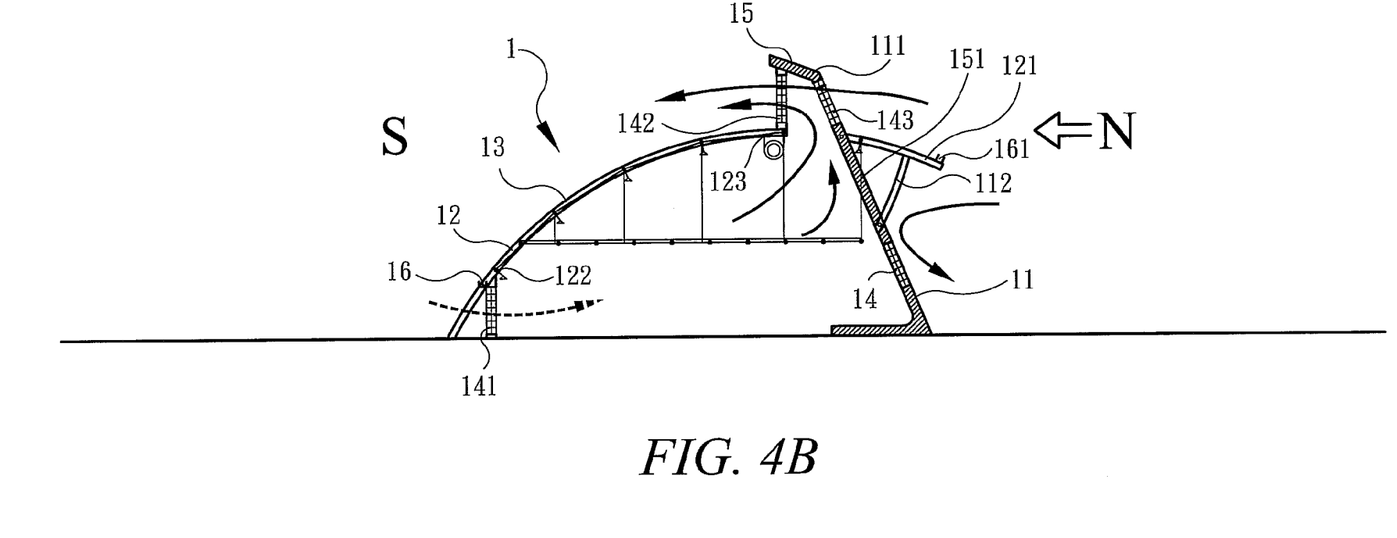
FIG. 4B illustrates a wind direction in winter of the subtropical monsoon climate for the present invention, as shown in FIG. 3.

FIG. 4B illustrates the louvered shutter 141, 142 and 143 opened and the louvered shutter 14 closed in winter. Because the louvered shutter 141 is a gravity intake, wind is guided toward the vents by the extension segments 121 of two curved tubular beams 12 and the steel sheet 151 accelerates discharge of the interior hot air from the louvered shutter 142 and introduction of the outdoor air from the louvered shutter 141 for higher ventilation efficiency. Cold air is not directly absorbed indoors nor is interior temperature suddenly reduced, which could adversely affect growth of plants.

Figure 5:
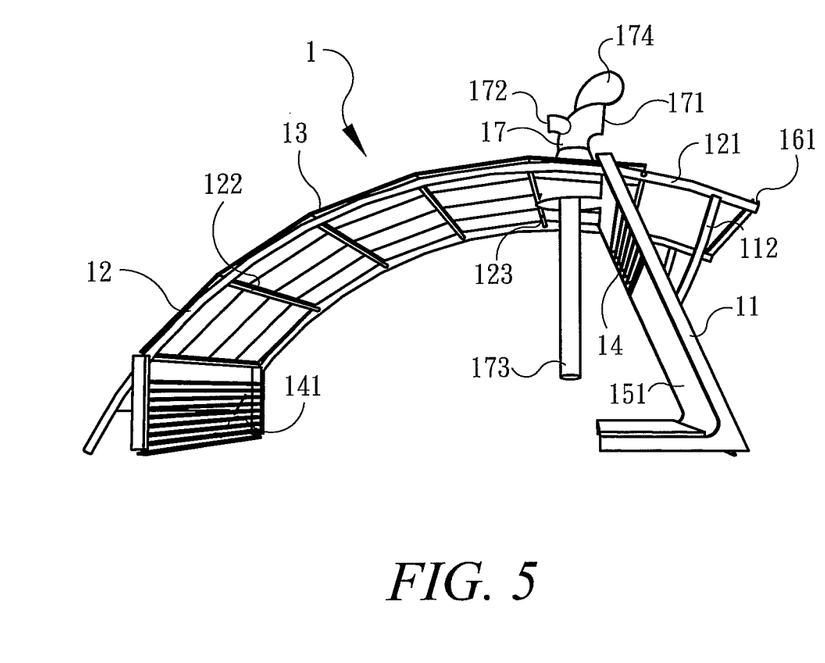
FIG. 5 illustrates another application of the first embodiment of the present invention.
Figure 6A:
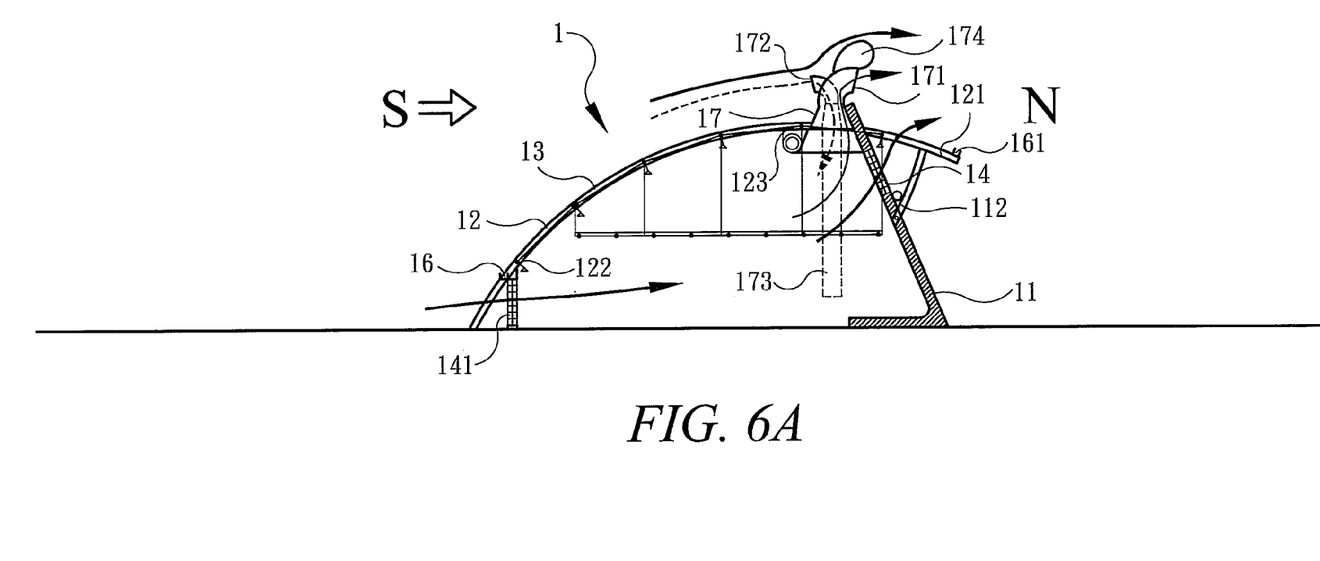
FIG. 6A illustrates a wind direction in summer of the temperate monsoon climate for the present invention, as shown in FIG. 5.

FIG. 5 illustrates another embodiment different from FIG. 2, in which the louvered shutter 14 is installed on the middle-to-upper segments of main brackets 11. A funnel cap 17 is installed between the rear small crossbeam 123 linking two curved tubular beams 12 and the main brackets 11, and is provided with two-way vents, a large orifice 171 and a small orifice 172. The large orifice 171 is equipped with a wind vane 174 and the funnel cap 17 is extended downward to develop an air refreshing tube 173. The structure erected in a temperate monsoon climate is intended for the film 13 to face windward a summer monsoon. FIG. 6 illustrates the louvered shutters 14 and 141 being opened (louvered shutter 141 as a wind-driven intake or gravity intake without wind flowing; louvered shutter 14 as a wind-driven vent). The wind vane 174 on the funnel cap 17 turns due to flowing wind and allows the small orifice 172 (the large orifice 171) to always face windward (leeward). The film 13 guides wind to be absorbed from the small orifice 172 and blow downward along an air refreshing tube 173 for air flow to be transferred to the bottom of the greenhouse, and louvered shutters 141 and 14 are set up along a diagonal to reduce dead space and increase ventilation efficiency indoors.

Figure 6B:
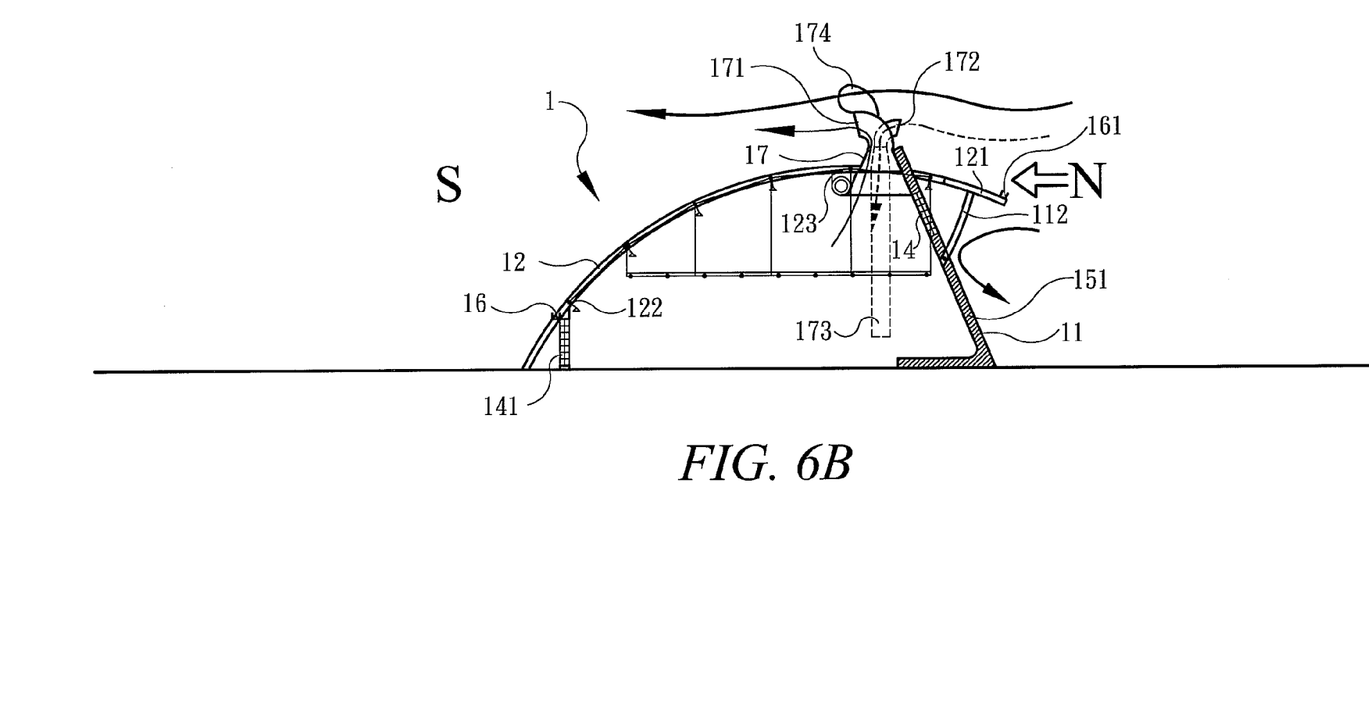
FIG. 6B illustrates a wind direction in winter of the temperate monsoon climate for the present invention, as shown in FIG. 5.

FIG. 6B illustrates louvered shutters 14 and 141 being closed in winter, large and small orifices 171 and 172 of the funnel cap 17 working as a gravity intake and a vent separately, so as to allow cold air absorbed into the greenhouse 1 to be heated by hot air which will be discharged. Also, the steel sheet 151 resists cold wind in winter.

Figure 7:
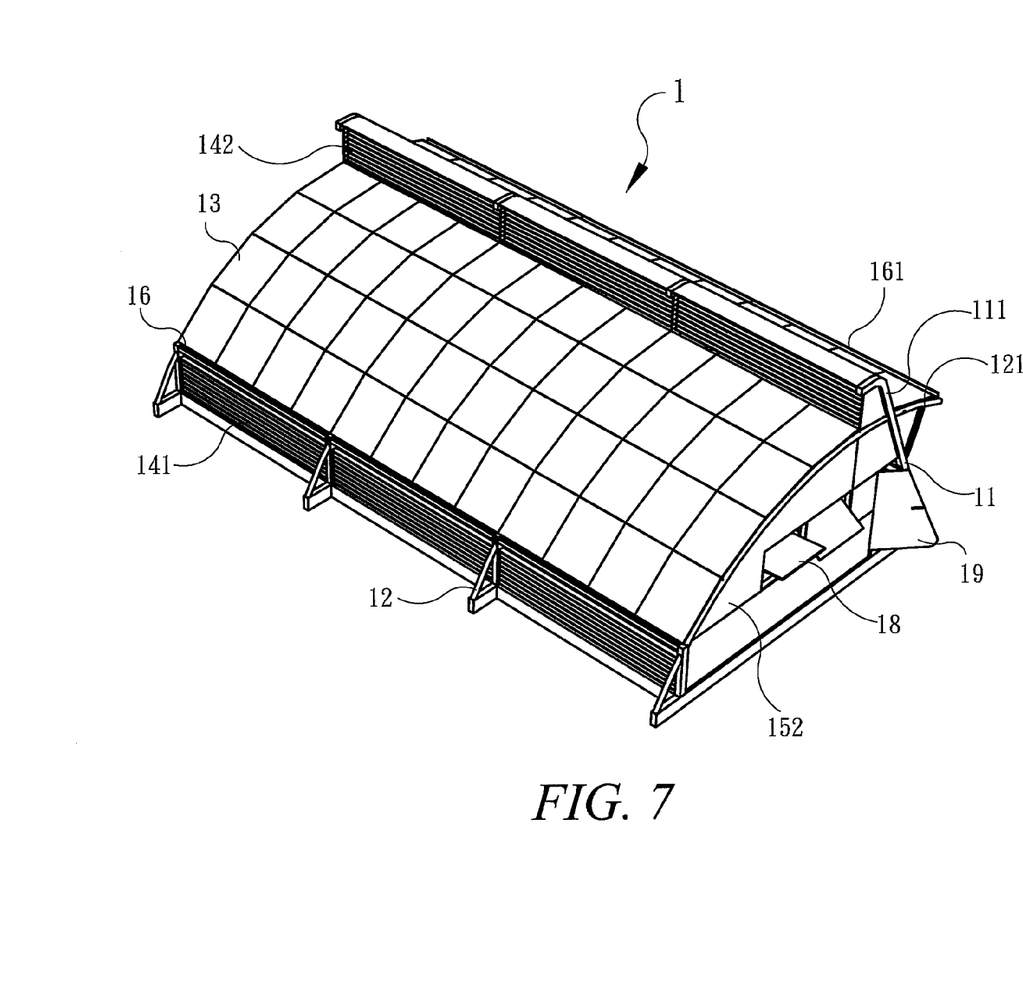
FIG. 7 illustrates a lateral assembly of the first embodiment in the present invention.

FIG. 7 illustrates multiple first skeleton units 1 to increase a windward area and promote a ventilation rate in summer. In this embodiment, there are three first skeleton units 1 side by side wherein the steel sheets 152 are not connected to two curved tubular beams 12 of the central first skeleton unit 1 but instead to curved tubular beams 12 of other two first skeleton units 1 on both sides for development of a greenhouse structure with a high ventilation rate.

Figure 8A:
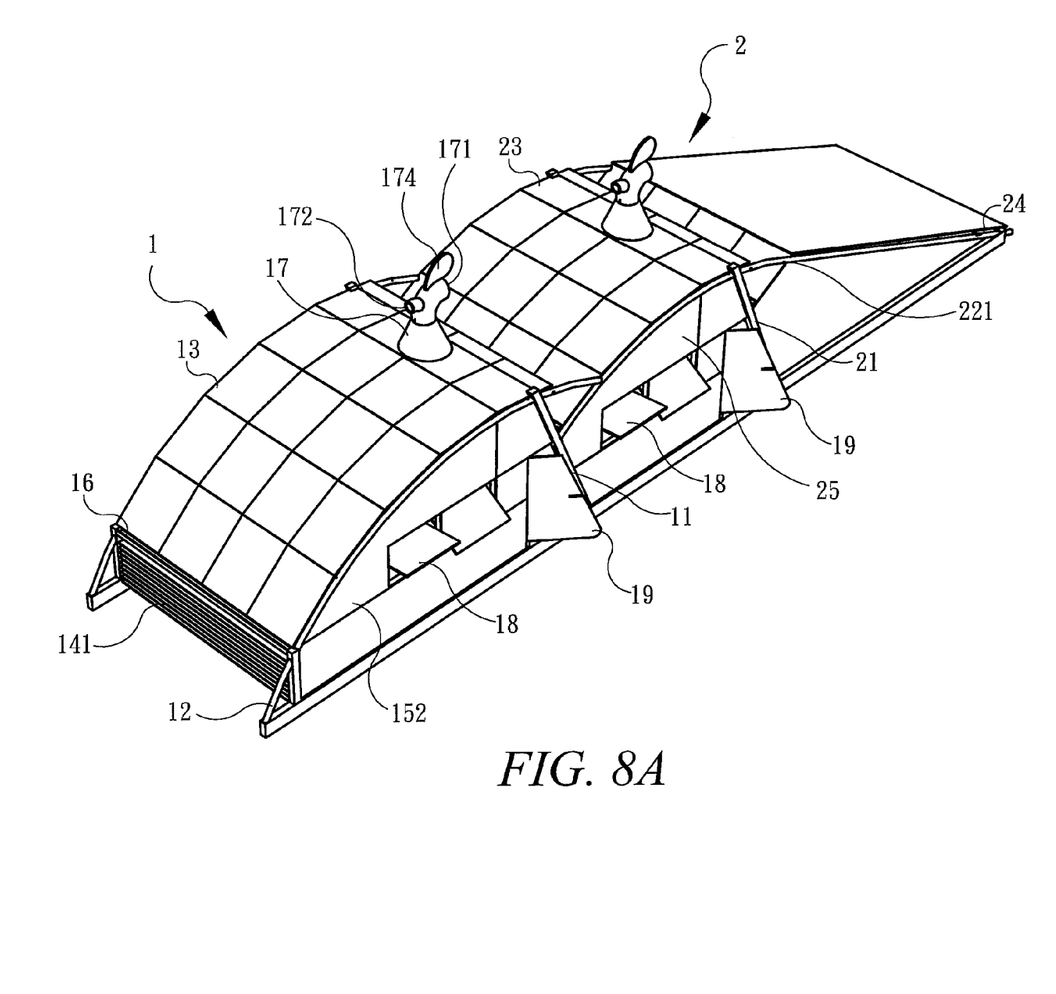
FIG. 8A illustrates a perspective view of the second embodiment of the present invention.
Figure 8B:
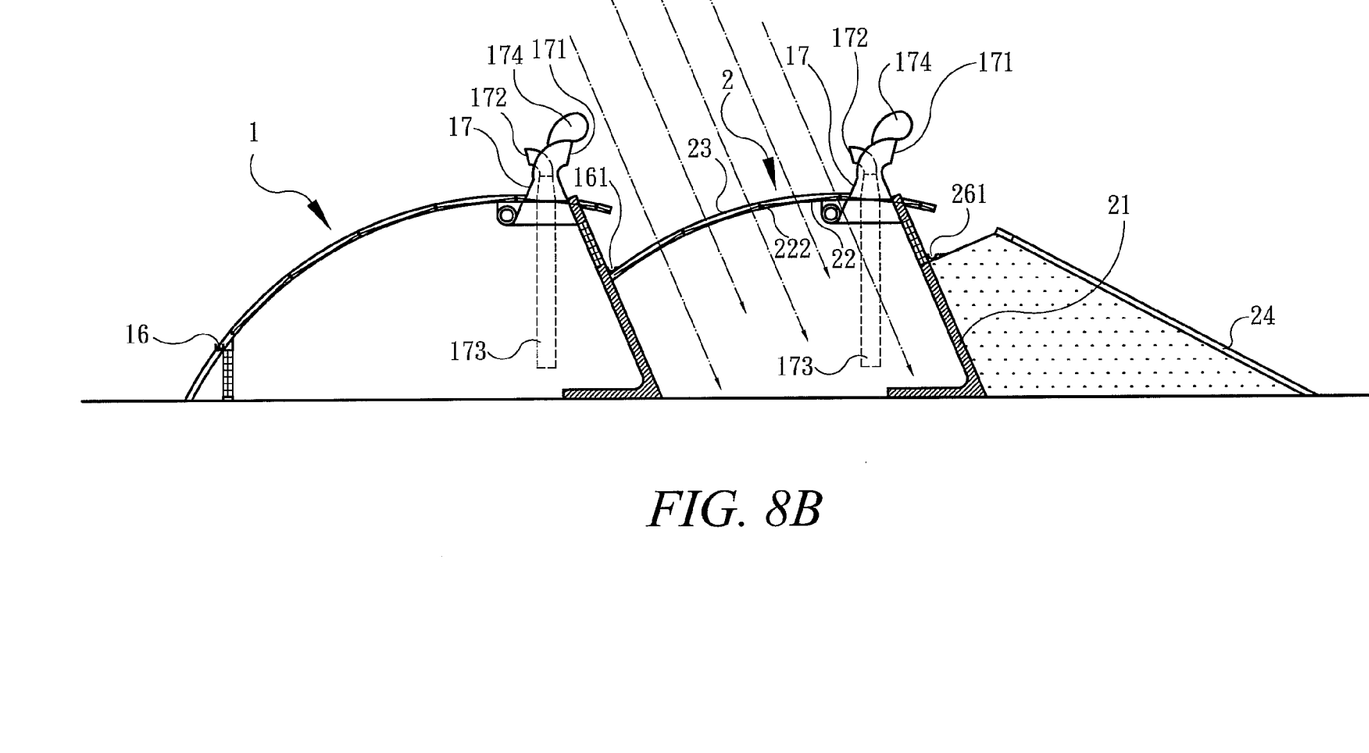
FIG. 8B illustrates a side view of the second embodiment of the present invention.

As shown in FIGS. 8A and 8B, the second embodiment of the present invention comprises the first skeleton unit 1 and the second skeleton unit 2, wherein the former is identical to that of the first embodiment and not repeatedly described hereinafter. The second skeleton unit 2 comprises two quasi-L-shaped master brackets 21, each of which is equipped with a port 211 at the top, and two curved tubular beams 22. Each of the two curved tubular beams 22 has one end penetrating the top of a main bracket 21 to develop an extension segment 221 further coupled with a straight tubular beam 24 for a wind wall or a windshield installed between two straight tubular beams 24, and has the other free end connected to the medium segment of one main bracket 11 on the first skeleton unit 1 and provided with a gutter 261 at the joint. Equidistant small crossbeams 222 are installed between two curved tubular beams 22 for a reinforced structure. A funnel cap 17 is installed between a rear small crossbeam 222 and main brackets 21 and comprises two-way vents, a large orifice 171, and a small orifice 172, wherein the small orifice 172 is equipped with an extended tube 173 and the large orifice 171 is provided with a wind vane 174. A film 23 is covered between two curved tubular beams 22 from front to back wherein the film 23 could be solar membrane glass (in this embodiment) or plastic film. Steel sheets 25 as walls are developed from lower edges of two curved tubular beams 22 and provided with windows 18 and door planks 19.

In addition, the gradient of a master bracket 11 on the first skeleton unit 1 or a main bracket 21 on the second skeleton unit 2 in the present invention is developed by an algorithm. FIG. 8 illustrates the present invention erected in Harbin (Latitudes from 44° 04' to 46° 40'; solar elevation angle at noon in summer: 68.5°; solar elevation angle at noon in winner: 21.5°) wherein both the film 13 covered between two curved tubular beams 12 of the first skeleton unit 1 and the film 23 covered between two curved tubular beams 22 of the second skeleton unit are southward and manufactured with solar membrane glass for increased sunshine hours. Effective incident angles of sunlight and power are stably supplied in summer or winter. Gradients of main brackets 11, 21 are parallel to incident angles of sunlight in summer, which results in sunshine hours of the second skeleton unit 2 not being affected by main brackets 11 of the first skeleton unit 1.

Figure 9:
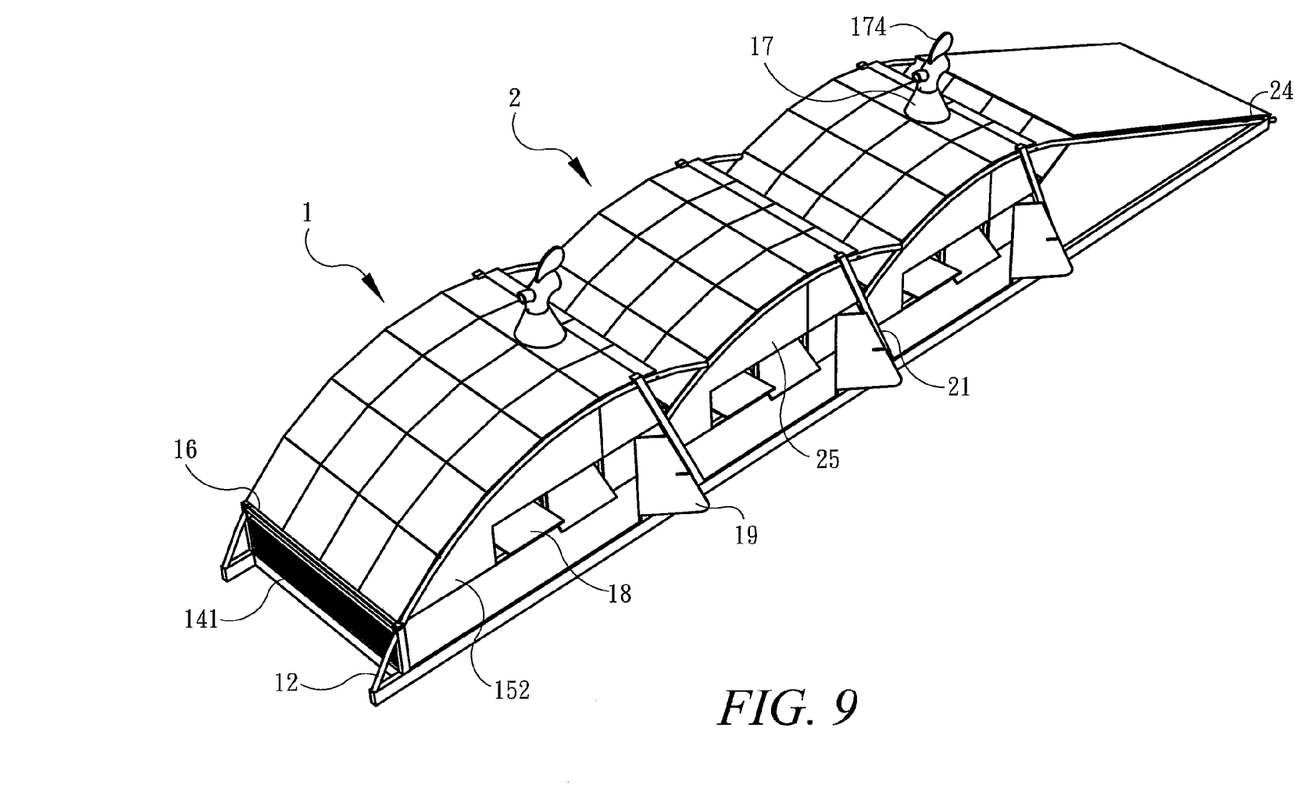
FIG. 9 illustrates a longitudinal assembly of the second embodiment of the present invention.

FIG. 9 illustrates a first skeleton unit 1 and several second skeleton units 2 (two second skeleton units 2 in this embodiment) which are arranged from front to back. Two main brackets 11 of the first skeleton unit 1 are not connected to the steel sheet 151. the second skeleton units 2 are arranged in front of the first skeleton unit 1, and the free ends of two curved tubular beams 22 on one second skeleton unit 2 are coupled with main brackets 11 on the first skeleton unit 1 for both the first skeleton unit 1 and the second skeleton units 2 connected one another. The free ends of two curved tubular beams 22 on one second skeleton unit 2 are coupled with main brackets 21 on the other second skeleton unit 2. The extension segment 221 is coupled with a straight tubular beam 24 for wind walls or windshields installed between two straight tubular beams 24. Steel sheets 152, 25 are mounted around the first skeleton unit 1 and two second skeleton units 2. Therefore, a windward area in winter of a temperate zone is reduced to match a structure of one greenhouse for ventilation rates.

Figure 10:
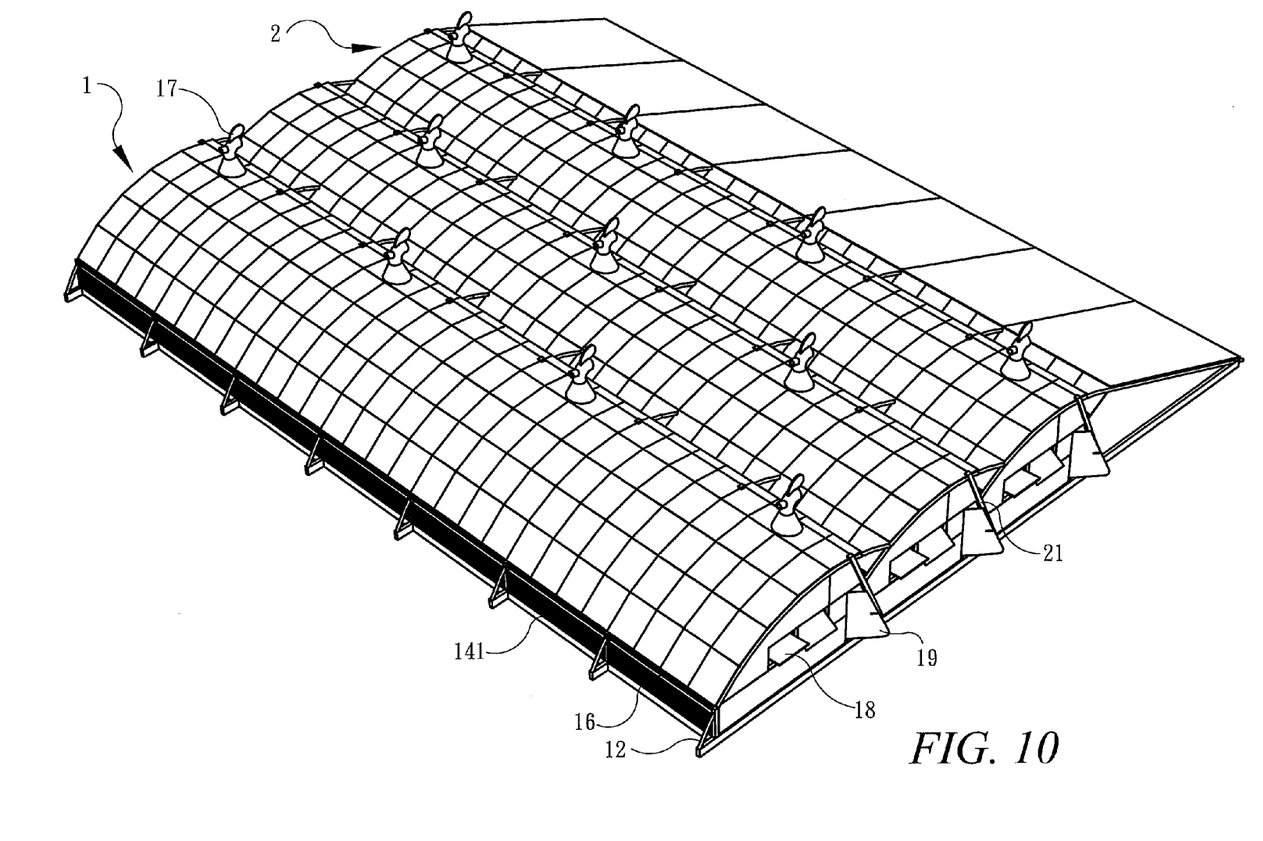
FIG. 10 illustrates a longitudinal and lateral assembly of the second embodiment of the present invention.
Figure 11:
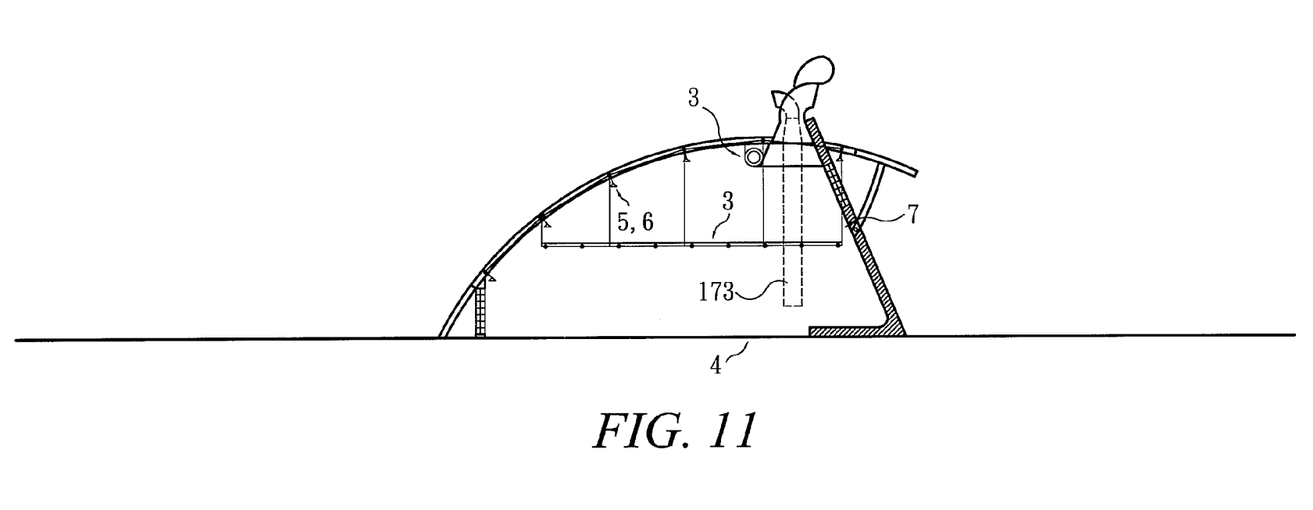
FIG. 11 illustrates a cross-sectional view of the embodiment of the present invention with other systems incorporated.

FIG. 10 illustrates several first skeleton units 1 and a second skeleton unit 2 combined to become a greenhouse matching a required size as shown in FIG. 7. Furthermore, the present invention is also provided with other systems for a collective application. FIG. 11 illustrates a greenhouse in the present invention being equipped with a LED light-compensation system 3, a micro-infiltrating irrigation system 4, a sprayer and cooling system 5, a $CO_2$ adjustment system 6, and a sensor system 7 for the greenhouse developed as an automatic environmental adjustment/control system and plants growing under best conditions.

It must be emphasized that the said disclosures demonstrate the preferred embodiments of the present invention only and cannot be used to restrict other embodiments of the present invention. Any significant change or adjustment made by any person skilled in the art should be still referred to as the essence content of the present invention.

What is claimed is:
1. A canopy greenhouse control system comprising:
a first skeleton unit comprising
a plurality of main brackets which are symmetrically arranged, wherein each of the main brackets extends to the upper edge of a curved tubular beam, and wherein one end of the curved tubular beam protrudes from each main bracket;
a plurality of small crossbeams between the two curved tubular beams to reinforce the structure of the system;
at least one louvered shutter between the two curved tubular beams and the two main brackets;
a film covering between the two curved tubular beams;
a first skeleton comprising a steel sheet removably disposed over gaps of two main brackets or the lower edges of two curved tubular beams, each of the two curved tubular beams comprising:
a first end penetrating.one of the plurality of maion brackets near one tip and a free end of the one of the plurality of main brackets; and
a second end coordinating with the one of the plurality of main brackets at another tip of the one of the plurality of main brackets; and
a gutter constructed at the edge of the first skeleton unit;
wherein each of the plurality of small crossbeams has a first free end and a second end coordinating with the another tip of the one of the plurality of main brackets, and wherein the middle segment of the main bracket is coupled with an upward curved slanted strut which is connected to the curved tubular beam and the gutter is further constructed between the curved slanted strut and the main bracket.

2. The canopy greenhouse control system as claimed in claim 1 further comprising:
   a second skeleton unit for connection with the first skeleton unit, the second skeleton unit comprising:
   two main brackets which are symmetrically arranged, wherein each of the main brackets extends into the upper edge of the curved tubular beam, and wherein one end of the curved tubular beam protrudes from each main bracket at one end and the other end connects to the first skeleton unit;
   a plurality of small crossbeams between the two curved tubular beams to reinforce the structure of the system;
   a film covering between the two curved tubular beams;
   a second skeleton comprising a steel sheet removably disposed over gaps of two main brackets or the lower edges of two curved tubular beams to become a second skeleton;
   wherein the second skeleton unit assembles with the first skeleton unit to construct the intelligent canopy greenhouse control system.

3. The canopy greenhouse control system according to claim 2, wherein the intelligent canopy greenhouse control system is constructed Of a plurality of the first and second skeleton units arranged laterally or longitudinally.

4. The canopy greenhouse control system according to claim 1, wherein the main bracket is a L-shaped framework which is equipped with a port on the top for connection of a bent extension part.

5. The canopy greenhouse control system according to claim 4, wherein the bent extension part is coupled with at least the steel sheet and the at least one louvered shutter.

6. The canopy greenhouse control system according to claim 1, wherein the louvered shutter between the two main brackets in the first skeleton unit is connected to the middle-to-lower or middle-to-upper segments of the main bracket.

7. The canopy greenhouse control system according to claim 1, wherein the film is a thin-film solar glass or a plastic film.

8. The canopy greenhouse control system according to claim 1, wherein each of the two curved tubular beams in the first skeleton unit has one end vertically contacting the ground and the two curved tubular beams are combined with the two louvered shutters, one of the louvered shutters being located at the ground side of the curved tubular beam and equipped with the gutter at a joint of the top of the louvered shutter and the film, and the other louvered shutter being vertically coupled at the apex of the curved tubular beams.

9. The intelligent-canopy greenhouse control system according to claim 1, wherein the steel sheets are compound metal curtain walls or double-layer coated steel sheets.

10. The canopy greenhouse control system according to claim 1, wherein the steel sheet is are between two curved tubular beams of the first skeleton unit and is further provided with side windows or side doors.

11. The canopy greenhouse control system according to claim 1, wherein an extended end of the two curved tubular beams protrudes from the main bracket and is further coupled with the straight tubular beams.

12. The intelligent canopy greenhouse control system according to claim 2, wherein the small crossbeams installed on the two curved tubular beams of the first or second skeleton unit are coupled with a funnel cap used to guide wind indoors.

13. The canopy greenhouse control system according to claim 12, wherein the funnel cap is provided with two oppositely arranged vents.

14. The canopy greenhouse control system according to claim 13, wherein the vent has a tube extended from their base.

15. The canopy greenhouse control system according to claim 11, further comprising a wind wall or windshield that is constructed between the straight tubular beams.

* * * * *